United States Patent
Hakomori et al.

(10) Patent No.: US 8,063,457 B2
(45) Date of Patent: Nov. 22, 2011

(54) SEMICONDUCTOR STRAIN GAUGE AND THE MANUFACTURING METHOD

(75) Inventors: Ikuo Hakomori, Itabashi-ku (JP); Yuji Nakamura, Itabashi-ku (JP); Keiichi Nakanishi, Turugashima (JP); Koichi Ida, Turugashima (JP)

(73) Assignees: Tanita Corporation, Tokyo (JP); Toko, Inc., Tokyo (JP)

( * ) Notice: Subject to any disclaimer, the term of this patent is extended or adjusted under 35 U.S.C. 154(b) by 180 days.

(21) Appl. No.: 12/590,694

(22) Filed: Nov. 12, 2009

(65) Prior Publication Data

US 2010/0065933 A1  Mar. 18, 2010

Related U.S. Application Data

(62) Division of application No. 11/799,412, filed on May 1, 2007, now Pat. No. 7,666,699.

(30) Foreign Application Priority Data

May 1, 2006 (JP) .................................. 2006-127267

(51) Int. Cl.
*H01L 29/84* (2006.01)

(52) U.S. Cl. ................................ 257/417; 257/E29.324
(58) Field of Classification Search .................. 257/417, 257/418, 419, E29.324
See application file for complete search history.

(56) References Cited

U.S. PATENT DOCUMENTS 5,231,301 A * 7/1993 Peterson et al. .............. 257/419

\* cited by examiner

*Primary Examiner* — Zandra Smith
*Assistant Examiner* — Paul Patton
(74) *Attorney, Agent, or Firm* — Jordan and Hamburg LLP (57) ABSTRACT

A high-density impurity diffused layer of an identical conduction type to the semiconductor substrate on which the impurity is doped higher in density than the semiconductor substrate around the diffuse resistance region is provided, one side of the electrodes is formed extending to the high-density impurity diffused layer and the diffused resistance region and the high-density impurity diffused layer are connected in a semiconductor strain gauge that is formed on the surface of the semiconductor substrate of a fixed conduction type and is provided with the diffused resistance region of opposite conduction type to the semiconductor substrate and is provided with electrodes on both ends of the diffused resistance region.

23 Claims, 7 Drawing Sheets

FIG 7 ively used, which detects the changes in force applied utilizing the piezoelectric resistance effect of the semiconductor as variation in electric resistance. There are a bulk type

SEMICONDUCTOR STRAIN GAUGE AND THE MANUFACTURING METHOD

BACKGROUND OF THE INVENTION

This invention relates to a structure and manufacturing method of a semiconductor gauge using a diffused resistor, which can be used for various acceleration sensor pressure sensor, etc.

A strain gauge is used to detect acceleration and pressure in the prior art and there are various types in the strain gauge. The strain gauge using a semiconductor single crystal is used in many cases, which detects the changes in force applied utilizing the piezoelectric resistance effect of the semiconductor as variation in electric resistance. There are a bulk type gauge and a diffused type gauge in the semiconductor strain gauge using the piezoelectric resistance effect and it is necessary to apply manufacturing work on the semiconductor substrate because the semiconductor substrate itself becomes a gauge in each type.

Figure 7:
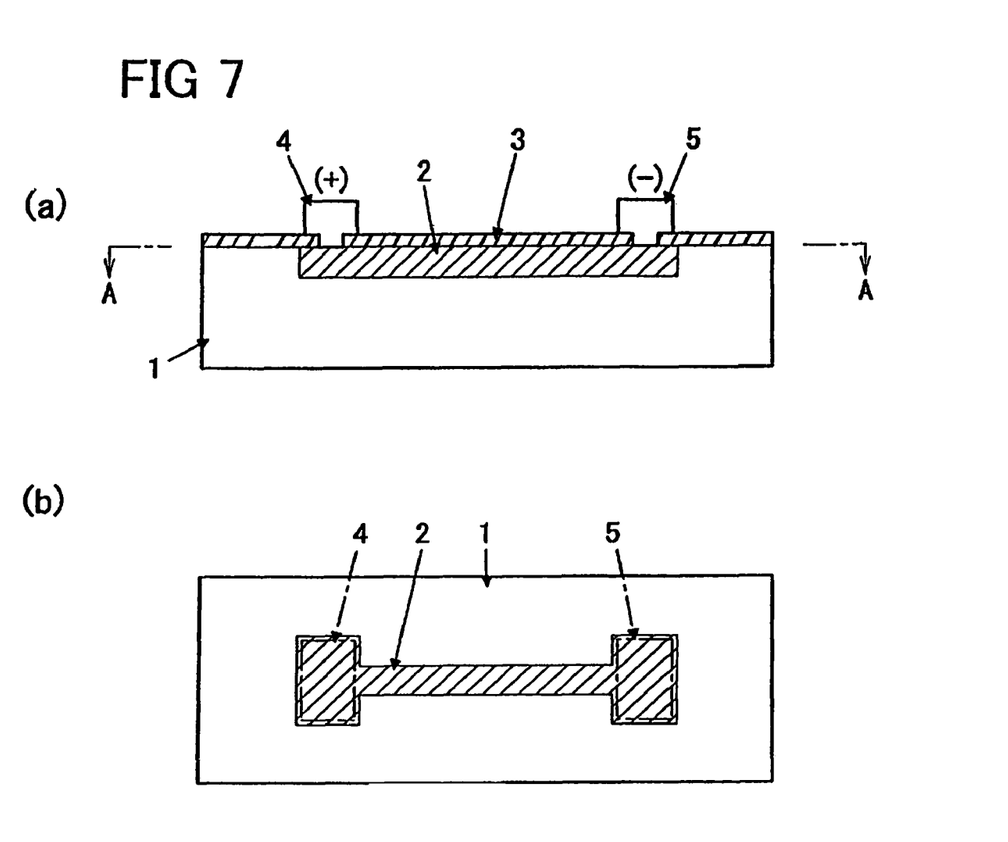
FIG. 7 is a drawing that shows structure of the diffused type gauge in the prior art and (a) is a vertical sectional view and (b) is a plane view viewed from an arrow A-A line direction in (a).

FIG. 7 shows the structure of a diffused type gauge used commonly and (a) is a vertical sectional view and (b) is a plan view viewed from an arrow A-A line direction in (a). A diffused resistor 2 of opposite conduction type is formed, diffusing a type P impurity into the surface of type N single crystal silicone substrate 1. A surface of the diffused resistor 2 is protected with oxide film 3 such as $SiO_2$, which is an insulated film and a positive (+) electrode 4 and a negative (−) electrode 5 are formed by metallic film of aluminum and the like after etching a part of the oxide film 3. It is not necessary to process the semiconductor substrate mechanically when the resistance layer is formed on the type N single crystal silicone substrate 1 as the semiconductor substrate by diffusion.

[Patent document 1] U.S. Pat. No. 6,635,910
[Patent document 2] JP, 2001-264188, Publication of unexamined patent applications
[Patent document 3] JP, 2004-531699, PCT Publication of unexamined patent applications

SUMMARY OF THE INVENTION

The structure of a diffused type gauge in the prior art is that the type P resistor 2 is only formed on the surface of type N semiconductor substrate, that is to say, type N single crystal silicone substrate 1 by the diffusion and therefore, it is under the condition in which a channel can be generated easily under the oxide film (insulated film) 3 by the impurity in the circumference or charge and then the impurity density of the type N semiconductor substrate is low. Therefore, the route where electric current flows may exist in a region other than the part of the type P diffused resistor 2 and it has become a problem that the resistance of the diffused type gauge becomes unstable.

The semiconductor strain gauge and the manufacturing method relating to this invention are to prevent generation of a channel in the diffused type strain gauge. When impurity and charge are stuck around the type P diffused resistor 2, or when the impurity density of the semiconductor substrate, that is, of the type N single crystal silicone substrate 1 is low, the generation of channel which is easy to be generated between electrodes pads is prevented and the output of the diffused type gauge is stabilized, for example, the above described problem is solved by opposite conduction type of impurity diffused layer of high-density around the type P diffused resistor. That is to say, this invention is characterized by a high-density impurity diffused layer of an identical conduction type to the semiconductor substrate on which the impurity is doped higher in density than the semiconductor substrate around the diffused resistance region is provided, in which one side of the electrodes is formed extending to the high-density impurity diffused layer and the diffused resistance region and the high-density impurity diffused layer are connected, and in which a voltage in which the leak from the diffused resistance region to the high-density impurity diffused layer is not generated is applied to the electrode, in a semiconductor strain gauge which is provided with a semiconductor substrate of a fixed conduction type, diffused resistance region of opposite conduction type to the semiconductor substrate formed on the surface of the semiconductor substrate and electrodes prepared on both end parts of the diffused resistance region.

This invention is characterized by a high-density impurity diffused layer of an identical conduction type to the semiconductor substrate on which the impurity is doped higher in density than the semiconductor substrate around the diffused resistance region being provided, in which any one of the electrodes is formed extending to the high-density impurity diffused layer and the diffused resistance region and the high-density impurity diffused layer are connected, and in which the voltage in which the leak from the diffused resistance region to the high-density impurity diffused layer is not generated being applied to the electrode, in a semiconductor strain gauge which is provided with a semiconductor substrate of a fixed conduction type, diffused resistance region of opposite conduction type to the semiconductor substrate formed on the surface of the semiconductor substrate and electrodes prepared on both end parts and a middle part of the diffused resistance region so that it can be a half bridge structure.

This invention is further characterized by a high density impurity diffused layer of an identical conduction type to the semiconductor substrate on which the impurity is doped higher in density than the semiconductor substrate around the diffused resistance region, in which any one of the electrodes is formed extending to the high-density impurity diffused layer and the diffused resistance region and the high-density impurity diffused layer are connected, and in which the voltage in which the leak from the diffused resistance region to the high-density impurity diffused layer is not generated is applied to the electrode, in a semiconductor strain gauge which is provided with a semiconductor substrate of a fixed conduction type, diffused resistance region of opposite conduction type to the semiconductor substrate formed on the surface of the semiconductor substrate and electrodes prepared at four places of the diffused resistance region so that it can be a full bridge structure.

This invention is also characterized by a high-density impurity diffused layer of the opposite conduction type to the semiconductor substrate formed in a part of the diffused resistance region and also connected to the electrode.

This invention is also characterized by an interval between the diffused resistance region and the high-density impurity diffused layer being 5 μm or more.

This invention is also characterized by the diffused resistance region of the opposite conduction type to the semiconductor substrate being formed on the surface of a fixed conduction type, a high-density impurity diffused layer of an identical conduction type to the semiconductor substrate on which the impurity is doped higher in density than the semiconductor substrate formed around the diffused resistance region, a guard film being formed on the surface of the semiconductor substrate, parts of the guard film in a part of two places of the diffused resistance region and on upper plane of a part of the high-density impurity diffused layer being removed, and two electrode films of which one film being connected to one place of the diffused resistance region and the other film being connected to the high density impurity diffused layer and the other places of the diffused resistance region are formed.

This invention is also characterized by the diffused resistance region of the opposite conduction type to the semiconductor substrate, consisting of a half bridge structure is formed on the surface of a fixed conduction type, a high-density impurity diffused layer of an identical conduction type to the semiconductor substrate on which the impurity is doped higher in density than the semiconductor substrate being formed around the diffused resistance region, a guard film being formed on the surface of the semiconductor substrate, parts of the guard film in a part of three places of the diffused resistance region and on upper plane of a part of the high-density impurity diffused layer being removed, and three electrode films of which any one film is connected to the high-density impurity diffused layer being formed.

In addition, this invention is characterized by the diffused resistance region of the opposite conduction type to the semiconductor substrate, consisting of a full bridge structure formed on the surface of a fixed conduction type, a high-density impurity diffused layer of an identical conduction type to the semiconductor substrate on which the impurity is doped higher in density than the semiconductor substrate being formed around the diffused resistance region, a guard film being formed on the surface of the semiconductor substrate, parts of the guard film in a part of four places of the diffused resistance region and on upper plane of a part of two places of the high-density impurity diffused layer being removed, and four electrode films of which any one film is connected to the high density impurity diffused layer being formed. The semiconductor strain gauge relating to this invention and the manufacturing method have the following effects and they have above described structure and function.

The invention described above forms the impurity diffused layer of opposite conduction type with high-density in the outer circumference of the diffused resistor and has the effects that can prevent generation of the channel and can prevent the resistance, which is the output of the diffused type gauge from being unstable.

BRIEF DESCRIPTION OF THE DRAWINGS

The objects and features of the invention will become apparent from the following description taken in conjunction with the preferred embodiment thereof with reference to the accompanying drawings in which.

DETAILED DESCRIPTION OF THE PREFERRED EMBODIMENT

Producing a semiconductor strain gauge relating of the invention is explained.

A diffused resistance region of opposite conduction type or diffused resistor is formed by diffusing the impurity on upper plane or surface of a semiconductor substrate of a fixed conduction type. A high-density impurity diffused layer of the identical conduction type to the semiconductor substrate is formed around the diffused resistor in order to prevent generation of a channel. The upper plane or surface of the semiconductor substrate is covered with a guard film, and the guard film in upper planes of a part of the diffused resistance region and a part of the high-density impurity diffused layer, that is, the guard film in a part to be connected to the electrode is removed by etching.

An electrode is formed by an electric conductor such as aluminum and the like to enable connection to an external circuit.

For example, as the leak is generated when the potential in type N silicone substrate becomes lower than that in type P diffused resistor or diffused resistance region, the high-density type N impurity diffused layer and type P diffused resistance region or diffused resistor are connected in positive (+) side electrode to maintain the same potential. And it is desirable to establish the high-density diffused layer of the identical conduction type to the diffused resistor under the electrode to obtain ohmic contact between the diffused resistor and the electrode.

Next, the specific working example on the semiconductor strain gauge relating to this invention is explained based on FIG. 1 through FIG. 6.

Figure 1:
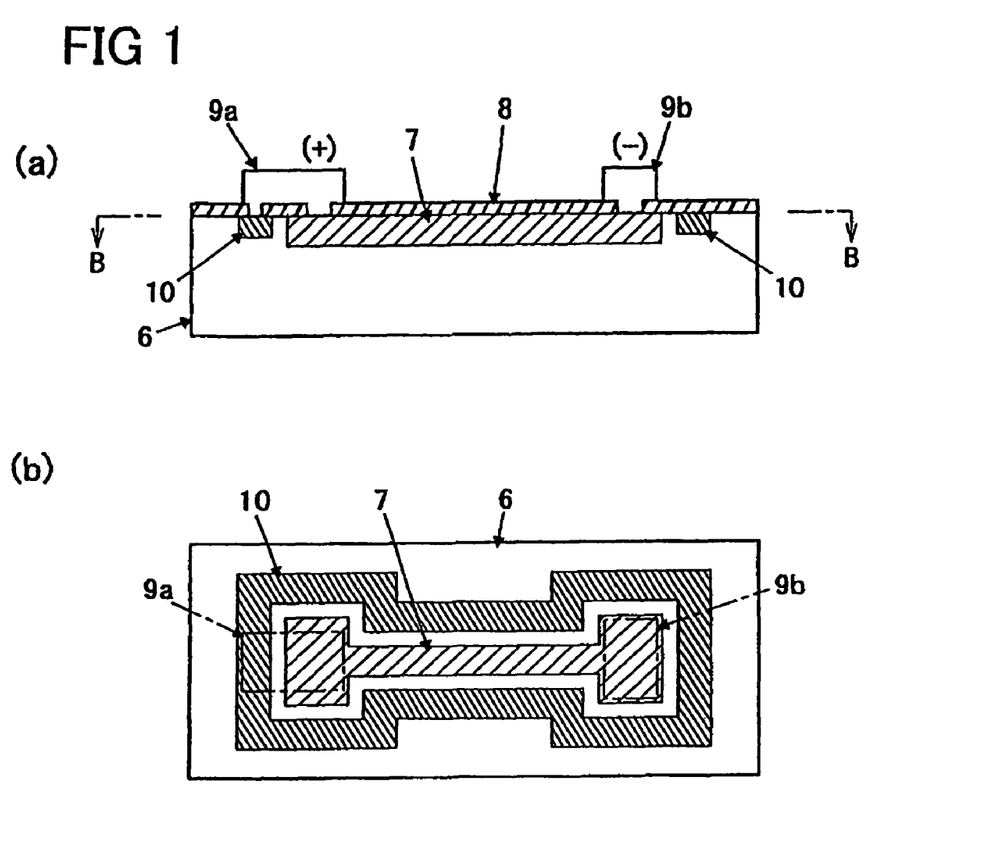
FIG. 1 is a drawing that shows the working example 1 in the semiconductor strain gauge relating to this invention and (a) is a vertical sectional view and (b) is a plan view viewed from an arrow B-B line direction in (a).

First, the working example 1 of this invention is explained referring to the drawing. FIG. 1, which shows the basic structure, shows the working example 1 of this invention that is applied to a single element. The (a) is a vertical sectional view and the (b) is a plane view viewed from an arrow B-B line direction in (a). The impurity is diffused on the surface of the type N single crystal silicone substrate 6 as a semiconductor substrate and the type P diffused resistance region (diffused resistor) 7 of opposite conduction type is formed. The guard film 8 is formed by oxide film, etc. such as $SiO_2$ on the surface of the type P diffused resistance region 7 and a part of the guard film 8 is removed by etching and the electrodes 9a, 9b are formed by metallic film such as aluminum and the like on that place. This invention is characterized in the point that a high-density type N impurity diffused layer 10 is formed so that it may surround the circumference of the type P diffused resistance region 7. Also, the electrode 9a in positive (+) side is connected to the high-density type N impurity diffused layer 10 in the working example 1.

Figure 2:
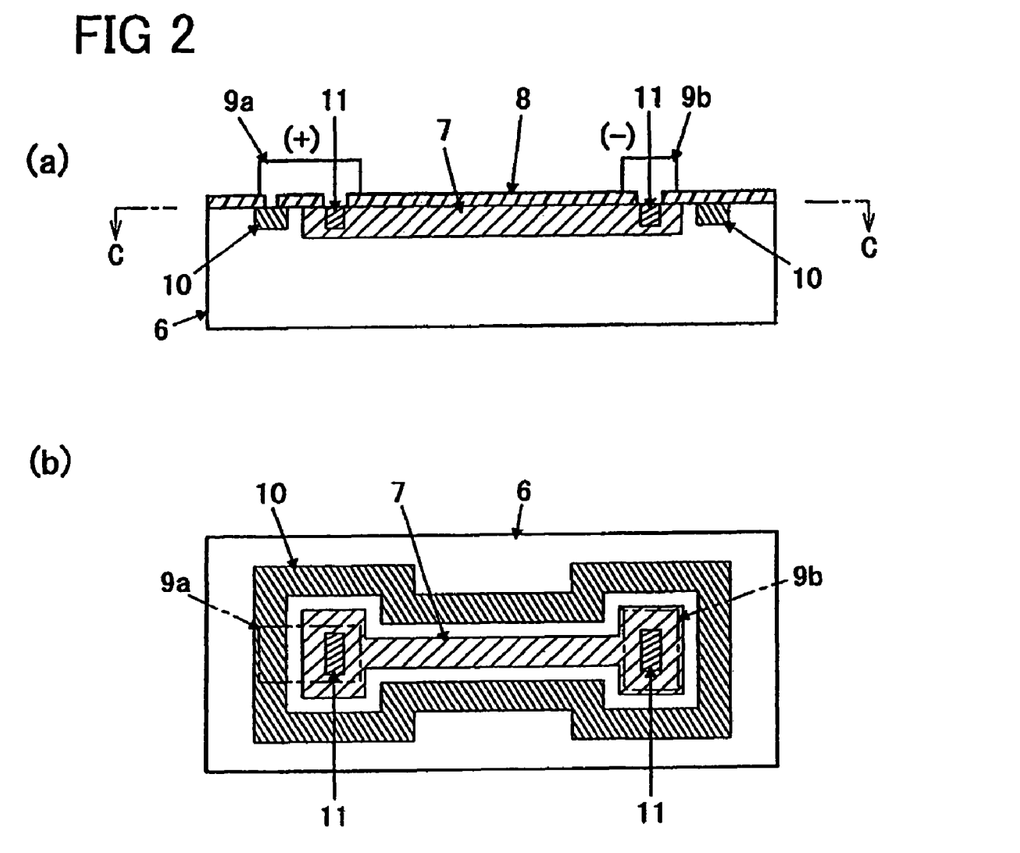
FIG. 2 is a drawing that shows the working example 2 in the semiconductor strain gauge relating to this invention and (a) is a vertical sectional view and (b) is a plan view viewed from an arrow C-C line direction in (a).

Next, the working example 2 of this invention is explained. FIG. 2 is the semiconductor stain gauge equipped with almost the same structure as in the working example 1 of this invention shown in FIG. 1. The (a) is a vertical sectional view and the (b) is a plane view viewed from an arrow C-C direction in (a). The different point with the working example 1 is in the point that it adopts the structure in which the high-density type P impurity diffused layer 11 is formed on under plane of the electrodes 9a, 9b shown in the working example 1 and the electrodes 9a, 9b are connected with the type P diffused resistance region 7 in ohmic.

The other constituents are the same as those in the working example 1 described above and the identical number and identical code are given and the explanation is omitted.

Figure 3:
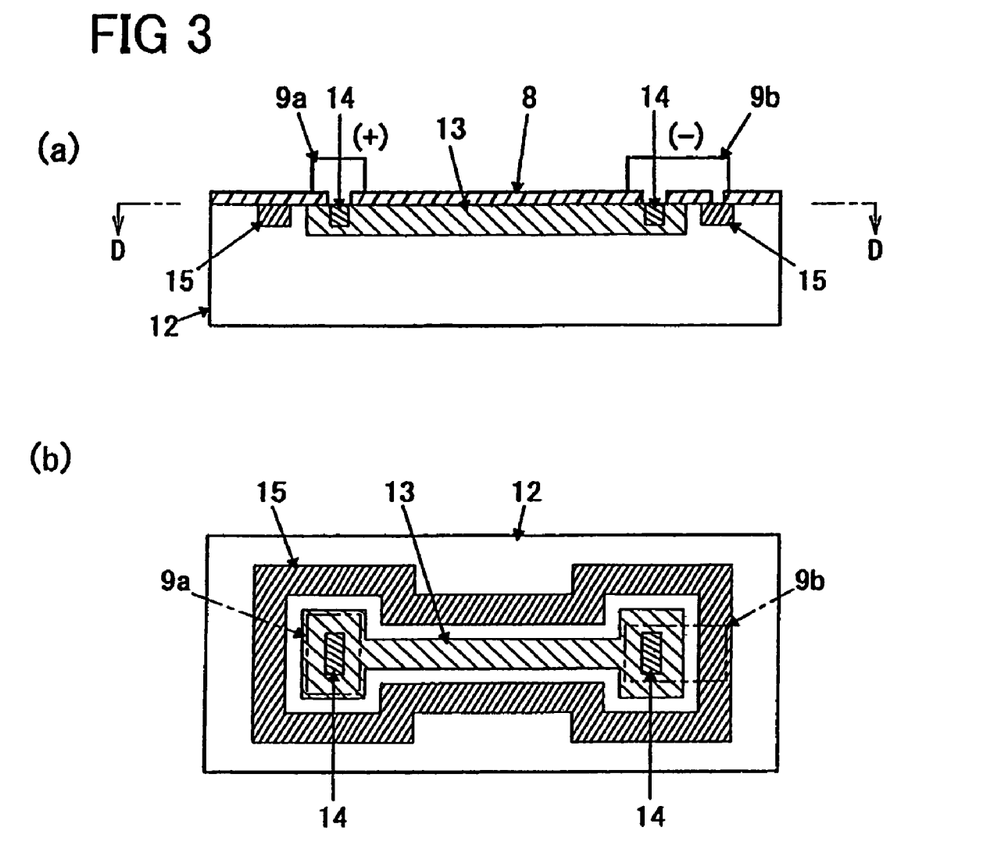
FIG. 3 is a drawing that shows the working example 3 in the semiconductor strain gauge relating to this invention and (a) is a vertical sectional view and (b) is a plan view viewed from an arrow D-D line direction in (a).

Next, the working example 3 of this invention is explained. FIG. 3 shows the working example 3 of this invention applied to a single element. The (a) is a vertical sectional view and the (b) is a plane view viewed from an arrow D-D line direction in (a).

The impurity is diffused on the surface of the type P single crystal silicone substrate 12 as a semiconductor substrate and the type N diffused resistance region (type N diffused resistor) 13 of opposite conduction type is formed. The guard film 8 is formed by oxide film, etc. such as $SiO_2$ on the surface of the type N diffused resistance region 13 and a part of the guard film 8 is etched and the electrodes 9a, 9b are formed by metallic film such as aluminum and the like. The high-density type N impurity diffused layer 14 is formed on the under plane of the electrodes 9a, 9b. This invention is characterized in the point that a high-density type P impurity diffused layer 15 is formed so that it may surround the circumference of the type N diffused resistance region 13. The electrode 9b in negative (−) side is connected to the high-density type impurity diffused layer 15 in this working example 3.

Figure 4:
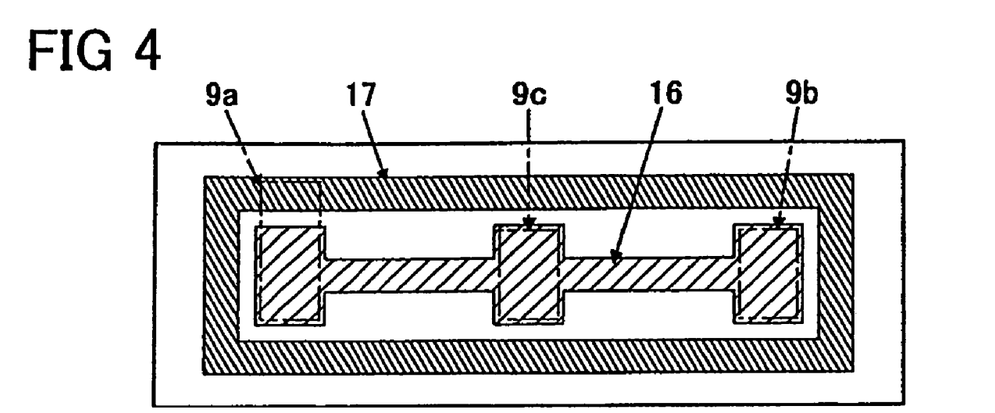
FIG. 4 is a plan view that shows the working example 4 in the semiconductor strain gauge relating to this invention.
Figure 5:
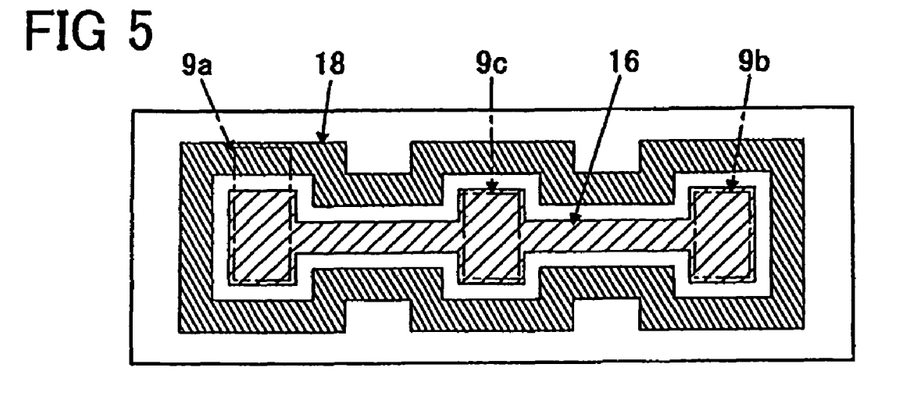
FIG. 5 is a plan view that shows the working example 5 in the semiconductor strain gauge relating to this invention.
Figure 6:
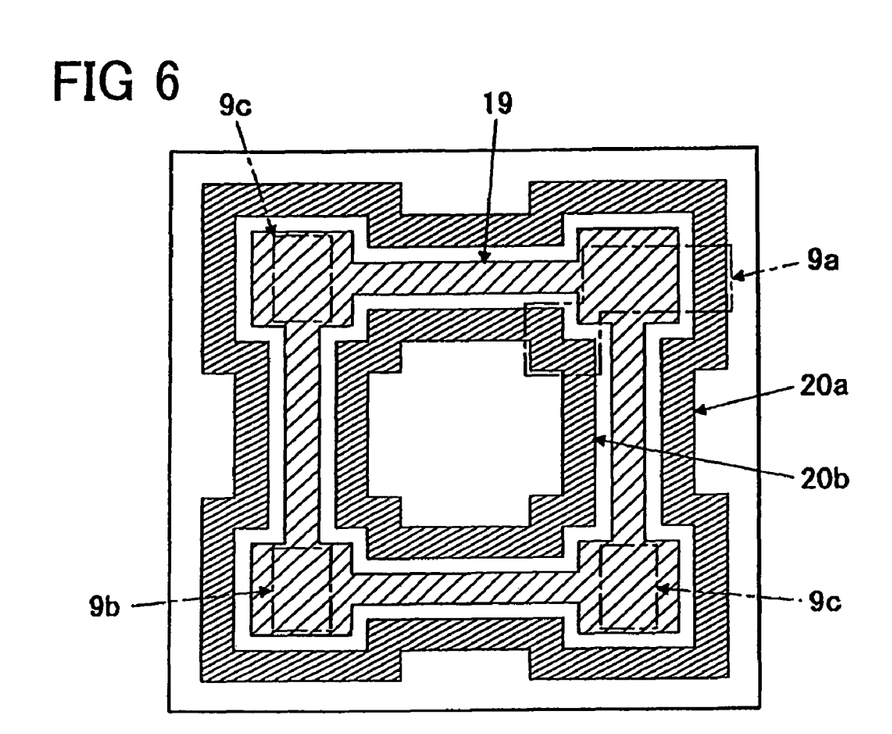
FIG. 6 is a plan view that shows the working example 6 in the semiconductor strain gauge relating to this invention.

FIG. 4 through FIG. 6 are plane views that show other working examples of this invention, that is to say, working example 4 through working example 6. Also, each plane view shows upper plane of the semiconductor substrate under the guard film. The plane shape and position of the electrode that is above the semiconductor substrate are shown with one-dot chain line for the sake of convenience.

FIG. 4 shows a half bridge structure of the type P diffused resistance region 16 and the type P resistor is used and the positive (+) side electrode 9a and the high-density type N impurity diffused layer 17 are connected. When the type N resistor is used in the diffused resistance region, the negative (−) side electrode 9b and the type P high-density impurity diffused layer (not illustrated) may be connected. Also, it is workable even if the intermediate electrode 9c positioned in the middle is made to be positive (+) electrode 9a, which is connected to the high-density type N impurity diffused layer 17.

FIG. 5 shows the semiconductor substrate of the same conduction type as the one shown in FIG. 4, however, it is the working example in which the shape of the high-density type N impurity diffused layer is different. It is the one that is formed by bending the high-density type N impurity diffuse layer 18 to fit to the shape of the type P diffused resistance region 16.

FIG. 6 shows a full bridge structure of the type P diffused resistance region 19, and the thigh-density type N impurity diffused layers 20a, 20b are formed outside and inside of the type P diffused resistance region 19, respectively, and the high-density type N impurity diffused layers 20a, 20b, which are formed outside and inside, respectively are connected to positive (+) side electrode 9a.

Also, the other constituents in working examples shown in FIG. 4 through FIG. 6 are identical to the working example 1, which was described above, and the explanation is omitted.

Next, a manufacturing method of the semiconductor strain gauge relating to this invention is explained to clarify this invention. The process for manufacturing method of the semiconductor strain gauge relating to this invention is as follows:

(1) The impurity diffused layers that can be type P or type N diffused resistance regions 7, 13 of opposite conduction type are formed on the surface of the fixed conduction type semiconductor substrate, that is, type N or type P single crystal silicone substrates 6, 12.

(2) The high-density type N or type P impurity diffused layers 10, 15 that are identical conduction types to one of the semiconductor substrates are formed around the type P or type N diffused resistance regions 7, 13. This high-density type N or type P impurity diffused layers 10, 15 may be formed with the interval of about 5 μm with the type P or type N diffused resistance regions 7, 13. If the interval between the high-density type N or type P impurity diffused layers 10, 15 and the type P or type N diffused resistance regions 7, 13 is widened, the effect for stabilizing resistance of output of the semiconductor strain gauge is lost, and so the interval may be set within the scope of about 3 mm or less.

(3) The guard film 8 is formed on the surface of the semiconductor substrate.

(4) The guard film 8 on a part of two positions in the type P or type N diffused resistance regions 7, 13 and on an upper plane of a part of the high-density type N or type P impurity diffused layers 10, 15 are removed.

(5) Two electrodes 9a, 9b in which one side is connected to one position of type P or type N diffused resistance regions 7, 13 in which the guard film 8 is removed, and the other side is connected to the other position of the high-density type N or type P impurity diffused layers 10, 15 and type P or type N diffused resistance regions 7, 13 in which the guard film 8 is removed are formed.

Next, trial cases are explained. The type P resistor was installed on the type N semiconductor substrate so that the resistance might be 3.5 kΩ by diffusion. The high-density type N impurity diffused layer was formed under the positive (+) side electrode and the high-density type N impurity diffused layer was formed under the negative (−) side electrode, respectively. The insulated guard film of $SiO_2$ was formed in 1 μm on the surface of the type N semiconductor substrate and the aluminum electrode with 1 μm thick was formed after a window was formed in etching. The back of the type N semiconductor substrate was ground to finish to be 25 μm thick and the dicing was carried out to obtain an element.

The size of a resistor for trial product was made to be 60 μm² in a cross section (30 μm wide, 2 μm deep), 750 μm long when the specific resistance was made to be 0.03Ω·cm. The size of the element was able to be made to be 0.36 mm×2.73 mm×0.025 mm. The gauge rate G of the trial product was G=(ΔR/R)·(1/ϵ) (where ϵ: strain, ΔR/R: resistance variation rate), which was about 100.

The invention claimed is:

1. A semiconductor strain gauge, comprising:
a semiconductor substrate of a fixed conduction type,
a diffused resistance region of opposite conduction type to the semiconductor substrate formed on a surface of the semiconductor substrate, and electrodes on both end parts of the diffused resistance region,
a high-density impurity diffused layer of an identical conduction type to the semiconductor substrate on which the impurity is doped, the impurity being higher in density than the semiconductor substrate around the diffused resistance region,
one side of the electrodes extending to the high-density impurity diffused layer and the diffused resistance region and the high-density impurity diffused layer, being connected, and wherein voltage in which leakage from the diffused resistance region to the high density impurity diffused layer is not generated is applied to the electrode.

2. A semiconductor strain gauge according to claim 1, further comprising a high-density impurity diffused layer of opposite conduction type to the semiconductor substrate formed in a part of the diffused resistance region and connected to any one of the electrodes.

3. A semiconductor strain gauge according to claim 1, wherein an interval between the diffused resistance region and the high-density impurity diffused layer is about 5 μm or less.

4. A semiconductor strain gauge according to claim 1, wherein an interval between the diffused resistance region and the high-density impurity diffused layer is about 3 μm or less.

5. A semiconductor strain gauge, comprising:
a semiconductor substrate of a fixed conduction type,
a diffused resistance region of opposite conduction type to the semiconductor substrate formed on a surface of the semiconductor substrate and electrodes on both end parts and a middle part of the diffused resistance region thereby forming a half bridge structure,
a high-density impurity diffused layer of an identical conduction type to the semiconductor substrate on which the impurity is doped, the impurity being higher in density than the semiconductor substrate around the diffused resistance region,
any one of the electrodes extending to the high-density impurity diffused layer, and the diffused resistance region and the high-density impurity diffused layer being connected, and wherein voltage in which leakage from the diffused resistance region to the high density impurity diffused layer is not generated is applied to the electrode.

6. A semiconductor strain gauge according to claim 5, further comprising a high-density impurity diffused layer of opposite conduction type to the semiconductor substrate formed in a part of the diffused resistance region and connected to any one of the electrodes.

7. A semiconductor strain gauge according to claim 5, wherein an interval between the diffused resistance region and the high-density impurity diffused layer is about 5 μm or less.

8. A semiconductor strain gauge according to claim 5, wherein an interval between the diffused resistance region and the high-density impurity diffused layer is about 3 μm or less.

9. A semiconductor strain gauge, comprising:
a semiconductor substrate of a fixed conduction type,
a diffused resistance region of opposite conduction type to the semiconductor substrate formed on a surface of the semiconductor substrate and electrodes at four places of the diffused resistance region thereby forming a full bridge structure,
a high-density impurity diffused layer of an identical conduction type to the semiconductor substrate on which the impurity is doped, the impurity being higher in density than the semiconductor substrate around the diffused resistance region, and
any one of the electrodes extending to the high-density impurity diffused layer, and the diffused resistance region and the high-density impurity diffused layer being connected, and wherein voltage in which leakage from the diffused resistance region to the high-density impurity diffused layer is not generated is applied to the electrode.

10. A semiconductor strain gauge according to claim 9, further comprising a high-density impurity diffused layer of opposite conduction type to the semiconductor substrate formed in a part of the diffused resistance region and connected to any one of the electrodes.

11. A semiconductor strain gauge according to claim 9, wherein an interval between the diffused resistance region and the high-density impurity diffused layer is about 5 μm or less.

12. A semiconductor strain gauge according to claim 9, wherein an interval between the diffused resistance region and the high-density impurity diffused layer is about 3 μm or less.

13. A semiconductor strain gauge, comprising:
a semiconductor substrate doped with an impurity of a first conduction type,
a diffused resistance region of a second conduction type opposite to that of the semiconductor substrate, said diffused resistance region being formed in the semiconductor substrate and having a diffused resistance region configuration defined by a resistance region perimeter of the diffused resistance region;
at least two electrodes displaced apart on the diffused resistance region;
a high-density impurity diffused layer formed in the semiconductor substrate, said high-density impurity diffused layer being of an identical conduction type to the semiconductor substrate, the impurity being higher in density than the density of the impurity doped in the semiconductor substrate adjacent the diffused resistance region;
said high-density impurity diffused layer having a configuration including a concaved perimeter conforming to at least a convex portion of the resistance region perimeter, said high-density impurity diffused layer being spaced apart from said diffused resistance region at said at least a portion of the resistance region perimeter by a space interval from the resistance region perimeter so as to follow the resistance region perimeter; and
said high-density impurity diffused layer including a high-density impurity diffused layer electrode for applying a guard potential to said high-density impurity diffused layer.

14. The semiconductor strain gauge according to claim 13, wherein said space interval is sufficiently small to permit said high-density impurity diffused layer at said guard potential to set a potential of the semiconductor substrate within the space interval so as to prevent current leakage from the diffused resistance region into the substrate.

15. The semiconductor strain gauge according to claim 14, wherein said space interval is set such that said current leakage from the diffused resistance region into the substrate is prevented when a like potential is applied to said high-density impurity diffused layer electrode and at least one electrode of said at least two electrodes, and said like potential differing in potential from each other of said at least two electrodes in a potential direction which in theory produces conduction from material of said second conduction type adjoining material of said first conduction type.

16. The semiconductor strain gauge according to claim 15, wherein said space interval is about 5 μm or less.

17. The semiconductor strain gauge according to claim 15, wherein said space interval is about 3 μm or less.

18. The semiconductor strain gauge according to claim 15, further comprising:
a first potential source applied to said high-density impurity diffused layer electrode and said at least one electrode of said at least two electrodes; and
a second potential source applied to other ones of said at least two electrodes.

19. The semiconductor strain gauge according to claim 18, wherein one electrode of said at least two electrodes is extended to said high-density impurity diffused layer electrode to effect electrical connection therebetween.

20. The semiconductor strain gauge according to claim 13, wherein said configuration of said high-density impurity diffused layer has an internal perimeter which includes said concaved perimeter and which surrounds the diffused resistance region.

21. The semiconductor strain gauge according to claim 20, wherein said space interval is sufficiently small to permit said high-density impurity diffused layer to set a potential of the semiconductor substrate within the space interval so as to prevent current leakage from the diffused resistance region into the substrate.

22. The semiconductor strain gauge according to claim 21, further comprising:
   a first potential source applied to said high-density impurity diffused layer electrode and said at least one electrode of said at least two electrodes; and
   a second potential source applied to other ones of said at least two electrodes.

23. The semiconductor strain gauge according to claim 22, wherein one electrode of said at least two electrodes is extended to said high-density impurity diffused layer electrode to effect electrical connection therebetween.

* * * * *